(No Model.)
A. GOODWIN.
Animal Trap.
No. 230,628. Patented Aug. 3, 1880.
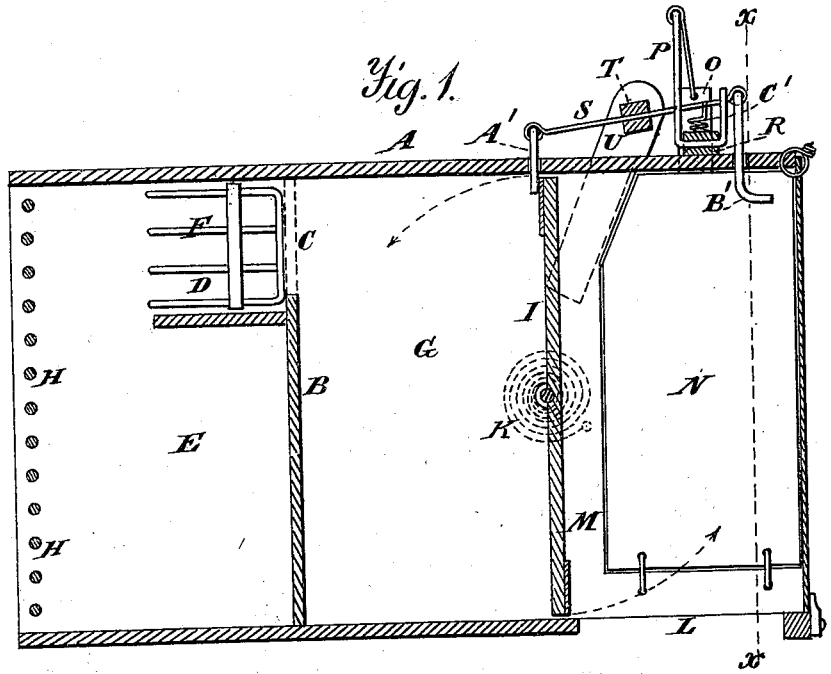
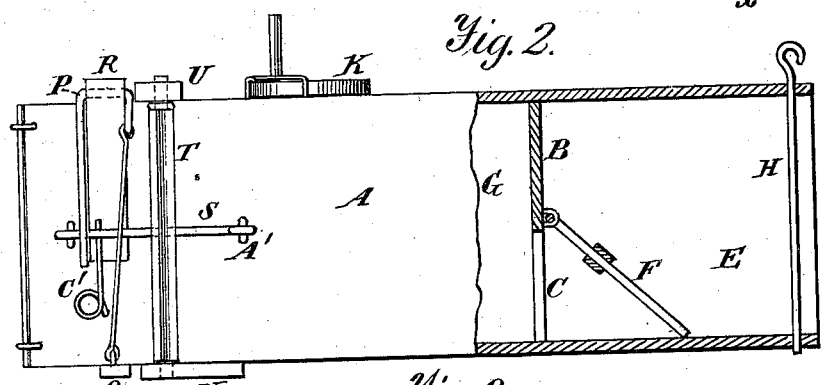
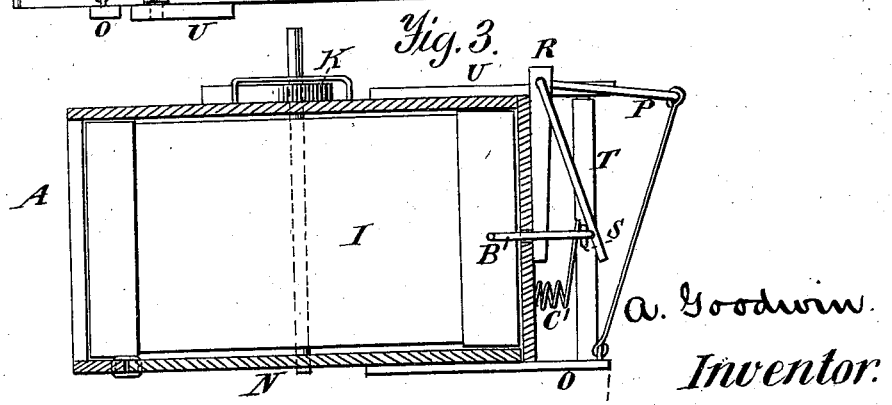
Witnesses.
A. Ruppert.
Jas. H. Lange.
Inventor:
A. Goodwin.
per Edson Brothers
Attorneys.

UNITED STATES PATENT OFFICE.

AUGUSTINE GOODWIN, OF MATTOON, ILLINOIS.

ANIMAL-TRAP.

SPECIFICATION forming part of Letters Patent No. 230,628, dated August 3, 1880.

Application filed March 26, 1880. (No model.)

*To all whom it may concern:*

Be it known that I, AUGUSTINE GOODWIN, of Mattoon, in the county of Coles and State of Illinois, have invented certain new and useful Improvements in Rat-Traps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in animal-traps; and it has for its object to insure the capture of the animal should he fail to seize the bait after entering the trap, and to provide for resetting the trap automatically after the capture of the animal, so as to secure a number of animals successively. These objects I attain by the mechanism illustrated in the accompanying drawings, in which—

Figure 1 is a longitudinal sectional view of the trap; Fig. 2, a rear elevation, and Fig. 3 a transverse vertical section on the line $x\ x$ of Fig. 1.

The letter A indicates an oblong rectangular box or chamber, divided into two compartments by a transverse partition, B. The said partition, at one side, is provided with an opening, C, from which extends a short passage, D, into the chamber E, the passage being provided with an inclined hinged door, F, opening into said passage, so that an animal can pass from the chamber G into chamber E by lifting the door, but will be prevented from passing back again by the automatic closing of the door.

The front of the chamber E is provided with a series of prison-bars, H, for the admission of light, so that the animal, when confined in the chamber G, will seek to escape into the chamber E through the door and passage-way before mentioned, the door being constructed of wire bars in order that the animal may see through it.

The letter I indicates a pivoted partition located in the chamber G, the journal of which extends through the top of the trap and is connected with a convolute spring, K, by which the partition is rotated to secure the animal, as more fully hereinafter explained.

L indicates an opening at one side of the trap for the entrance of the animal, leading into a passage, M, the bottom of which consists of a hinged platform, N, provided at the rear end with an extension, O, which connects with one end of an angle-lever, P, pivoted to a bracket, R, secured to the rear of the trap. The free end of said angle-lever rests against a straight lever, S, secured to a rock-shaft T, journaled in the brackets U, projecting from the rear of the trap. To one end of said lever S is secured a catch, A', extending through the rear wall of the trap, and serving, when the trap is set, to prevent the partition I from turning. To the other end of said lever is secured a hook, B', passing into the passage M through the rear wall of the trap, to which the bait is secured.

The trap is set by turning the partition I until the spring K is fully wound, the catch A' being withdrawn for the purpose. The catch is then released, and is thrown in front of the rear edge of the pivoted partition by means of the spiral spring C' bearing against the lever S. The hook B' is supplied with a proper bait when the trap is set. Upon the entrance of the animal and seizure of the bait the catch will be withdrawn through the medium of the lever S, and the partition I will be partially rotated, throwing the animal into chamber G, the catch in the meantime engaging the partition, so as to prevent further rotation and secure the animal and reset the trap.

Should the animal fail to spring the trap by pulling at the bait, his weight, together with his struggles to obtain the bait, will depress the hinged platform and effect the purpose.

Having described my invention, what I claim, and desire to secure by Letters Patent, is—

1. In combination with the hinged platform N, the pivoted partition I, spring K, lever S, catch A', and connections, all adapted and combined to operate as set forth.

2. In combination with the pivoted partition I, spring K, hinged platform N, lever S, catch A', and hook B', all arranged to operate substantially as specified.

In testimony that I claim the foregoing I have hereunto set my hand this 17th day of March, 1880.

AUGUSTINE GOODWIN.

Witnesses:
 RILEY FODDRILL,
 W. J. STOTTS.